May 8, 1934. H. W. TUXBURY ET AL 1,958,120
OIL SEAL
Filed Aug. 3, 1931
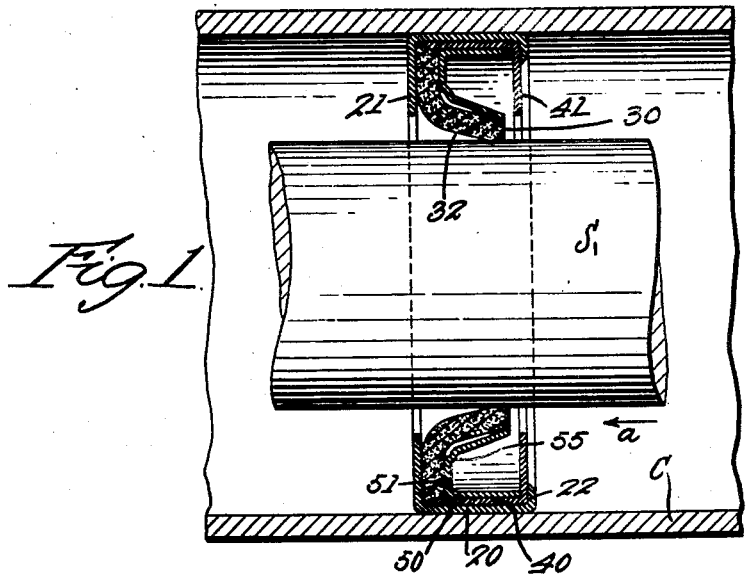
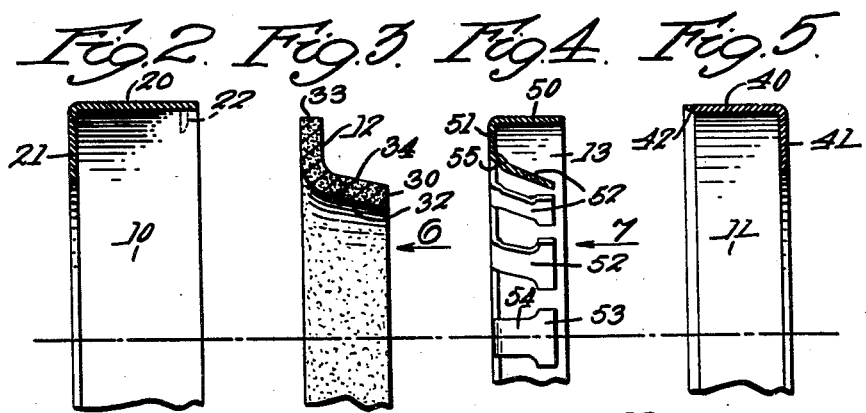
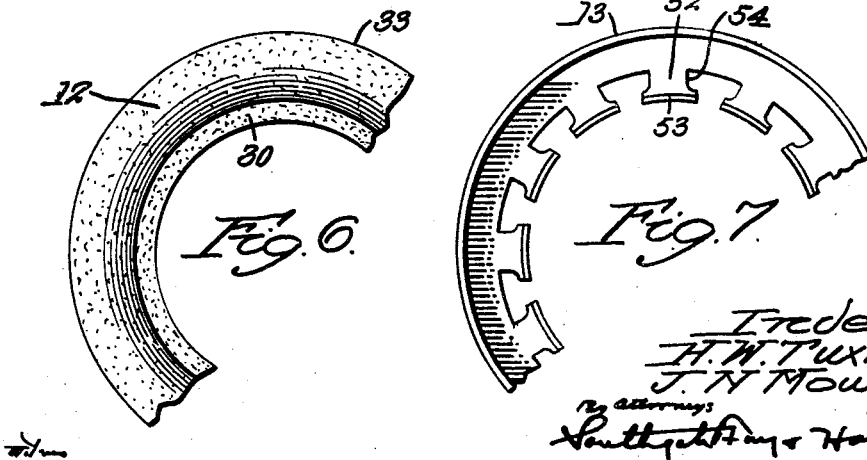

Patented May 8, 1934

1,958,120

UNITED STATES PATENT OFFICE 1,958,120

OIL SEAL

Henry Wellman Tuxbury and John N. Mowery, Worcester, Mass.; said Tuxbury assignor to Graton & Knight Company, Worcester, Mass., a corporation of Massachusetts and said Mowery assignor to Worcester Pressed Steel Company, Worcester, Mass., a corporation of Massachusetts Application August 3, 1931, Serial No. 554,842

2 Claims. (Cl. 288—1)

This invention relates to means for preventing oil leakage lengthwise of a rotating shaft and is particularly designed for use in connection with automobile axles.

It is the general object of our invention to provide an improved oil seal for preventing such axle leakage, particularly between the differential of an automobile and the wheel hub or bearing.

To the accomplishment of this general object we have improved the construction of such oil seals in many important respects. A particularly important feature of our invention relates to the provision of an improved and much more effective annular spring in an oil seal. We have also provided a casing of definite over-all dimensions when assembled, and have provided a construction in which all of the assembled parts will be accurately concentric.

Our invention further relates to arrangements and combinations of parts which will be hereinafter described and more particularly pointed out in the appended claims.

A preferred form of our invention is shown in the drawing in which

Fig. 1 is a sectional side elevation of our improved oil seal in position for use;

Fig. 2 is a partial sectional elevation of the outer casing ring;

Fig. 3 is a partial sectional elevation of the cup washer or packing;

Fig. 4 is a partial sectional elevation of the annular spring;

Fig. 5 is a partial sectional elevation of the inner casing member or cup;

Fig. 6 is a partial side elevation of the cup washer, looking in the direction of the arrow 6 in Fig. 3;

Fig. 7 is a partial side elevation of the annular spring, looking in the direction of the arrow 7 in Fig. 4.

Referring to the drawing, we have shown our improved oil seal as mounted in an axle sleeve or casing C and as having a shaft or axle S extending therethrough and sealed thereby, it being understood that the oil tends to leak along the shaft S in the direction of the arrow $a$ in Fig. 1.

Our improved oil seal comprises four annular parts, namely: An outer casing member or holder 10, an inner casing member or holder 11, a cup washer or packing 12, and an annular spring 13.

The outer casing member or holder 10 is preferably struck up from suitable sheet metal such as steel and comprises a cylindrical portion 20 and a bottom flange portion 21. When the parts are assembled, the free edge of the cylindrical portion 20 is crimped or pressed inward, as indicated at 22, to hold all parts of the oil seal in assembled relation.

The cup washer 12 is of a usual type but is preferably formed under heavy pressure, so that the material is compressed and is of unusually firm texture. The upper edge portion 30 of the cup washer 12 is preferably trimmed off accurately in a radial plane, so that the inner angle of the cup washer where it engages the shaft S will present a sharp edge or corner, with the conical inner face 32 and the end face 30 meeting in a sharp angle of 90° or less.

The extreme outer edge portion 33 of the cup washer 12 is made accurately concentric with the conical inner surface 32 and with the conical outer surface 34, and is made of such diameter that the cup washer will fit snugly into the inner casing member 11, as indicated in Fig. 1.

Preferably the surface 33 is of slightly larger outer diameter than the inner diameter of the casing member 11, so that the cup washer is slightly compressed radially as it is forced into the member 11.

The inner casing member 11 is similar in construction to the outer casing member or holder 10, and is similarly provided with a cylindrical portion 40 and an inwardly extending top flange 41. The free edge of the cylindrical portion 40 is beveled, as indicated at 42, to facilitate assembly of the cup washer therewith.

The annular spring 13 is preferably formed by a series of press operations from a suitable blank of resilient sheet metal, such as thin spring steel. Each spring 13 comprises a cylindrical outer portion 50 and an inwardly extending flange portion 51 having a plurality of spring fingers 52 projecting inward at an angle from the inner edge of the flange 51. Each of these spring fingers 52 has an enlarged end portion 53 and a reduced attaching portion 54. Each finger 52 is also preferably off-set as indicated at 55 for a purpose to be described.

Having formed the four component parts of our improved oil seal, the parts are assembled in any convenient manner, as by placing the cup washer 12 within the spring fingers 52 of the annular spring 13, after which the cup washer 12 and spring 13 are slipped into the inner casing member 11. These assembled parts are then slipped into the outer casing member 10, after which the entire assembly is placed in a press which forces the parts together until the cylindrical portion 40 of the member 11 is seated against the bottom flange 21 of the outer casing member 10.

At the same time the cup washer 12 is forced into the open end of the inner casing member 11, and the flat flange portion of the cup washer 12 is compressed between the bottom flange portion 21 of the outer casing member 10 and the bottom portion 51 of the spring 13.

By the same press operation the edge portion 22 of the outer casing member 10 is crimped around the inner casing member 11. All parts of the oil seal are thus firmly secured at assembled relation.

We will now point out certain important advantages derived from the construction and method of procedure above described.

The provision of a sharp edge between the surface 30 and 32 of the cup washer adds greatly to the effectiveness of the seal, as anything in the nature of a rounded edge or funnel shaped surface will cause excessive leakage past the oil seal.

Reference to Fig. 1 indicates that the spring fingers 52 are spaced from the conical surface 34 of the cup washer, except at their extreme outer ends, where the widened portions 53 engage the cup washer adjacent the edge thereof and substantially opposite the point of engagement of the cap washer with the shaft S. Consequently, the spring pressure is applied at the point where it is most effective in holding the sharp edge portion of the washer closely in contact with the shaft S.

The wide end portions 53 are provided to give increased engagement with the surface 34 of the cup washer 12 so that the spring fingers may not be unduly forced into the leather when the leather becomes softened by the action of oil and heat during use.

The reduced connecting portions 54 are provided for reducing the spring pressure on the cup washer and for provided increased resilience. The off-set portions 55 of the spring fingers 52 are provided for decreasing the area of contact of the bottom or flange portion 51 of the spring 13 with the cup washer, so that the spring can be more easily forced into the flange portion of the washer when necessary to allow for slight differences in thickness of the washer.

We have also found it desirable to form the off-sets 55 in such manner that there is no substantial increase in free space between the conical portion of the cup washer and the spring fingers 52. Otherwise it has been found that when the material becomes softened there is a tendency to lengthen the conical portion of the cup washer, so that the edge of the washer extends beyond the ends of the spring fingers 52.

Our improved oil seal possesses other important advantages, among which is the fact that the over-all axial dimension of the oil seal is determined by the length of the cylindrical portion 40 of the inner casing member 11. This cylindrical portion is pressed firmly against the flange portion 21 of the outer casing member 10 during assembly, and is held firmly seated in such position by the inwardly off-set flange 22.

Another important advantage lies in the fact that all of the parts may be easily made to accurate diameters, so that they may be readily assembled and so that when assembled they will all be accurately concentric.

Having thus described our invention and the advantages thereof, we do not wish to be limited to the details within disclosed otherwise than as set forth in the appended claims, but what we claim is:—

1. An oil seal comprising an outer casing member, an inner casing member, a cup washer, an annular sheet metal ring having an outer cylindrical portion fitting said inner casing member and effective to transmit axial pressure, a flat washer-engaging portion, and a plurality of spring fingers extending inwardly and axially from said flat portion, said fingers each having a portion abruptly offset out of the plane of said flat portion and away from said cup washer adjacent their point of attachment to said flat portion.

2. An oil seal comprising an outer casing member, an inner casing member, a cup washer, an annular sheet metal ring having a plurality of spring fingers yieldingly engaging said cup washer, and means to hold said parts in assembled relation, said inner casing member having a cylindrical portion with an inner beveled edge facilitating assembling of said spring and cup washer therein, said inner casing member being assembled in and directly engaging said outer casing member, both axially and radially, and said cup washer and ring being assembled in and centered by said inner casing member.

HENRY WELLMAN TUXBURY.
JOHN N. MOWERY.